(No Model.)

E. & J. P. SWARTZWELDER.
MACHINE FOR BENDING AND WELDING LINKS.

No. 304,676. Patented Sept. 2, 1884.

WITNESSES:
R. H. Whittlesey
C. M. Clarke

INVENTORS.
Emmett Swartzwelder.
John P. Swartzwelder.
By George H. Christy atty

UNITED STATES PATENT OFFICE.

EMMETT SWARTZWELDER AND JOHN P. SWARTZWELDER, OF SHARPSBURG, PA., ASSIGNORS TO THEMSELVES, JOHN SCOTT, AND JOHN L. SMITH, ALL OF SAME PLACE, AND CHARLES A. SCOTT, OF PITTSBURG, PA.

MACHINE FOR BENDING AND WELDING LINKS.

SPECIFICATION forming part of Letters Patent No. 304,676, dated September 2, 1884.

Application filed February 20, 1884. (No model.)

*To all whom it may concern:*

Be it known that we, EMMETT SWARTZWELDER and JOHN P. SWARTZWELDER, citizens of the United States, residing at Sharpsburg, county of Allegheny, State of Pennsylvania, have invented or discovered a new and useful Improvement in Machines for Bending and Welding Links; and we do hereby declare the following to be a full, clear, concise, and exact description thereof, reference being had to the accompanying drawings, making a part of this specification, in which—like letters indicating like parts—

Figure 1:
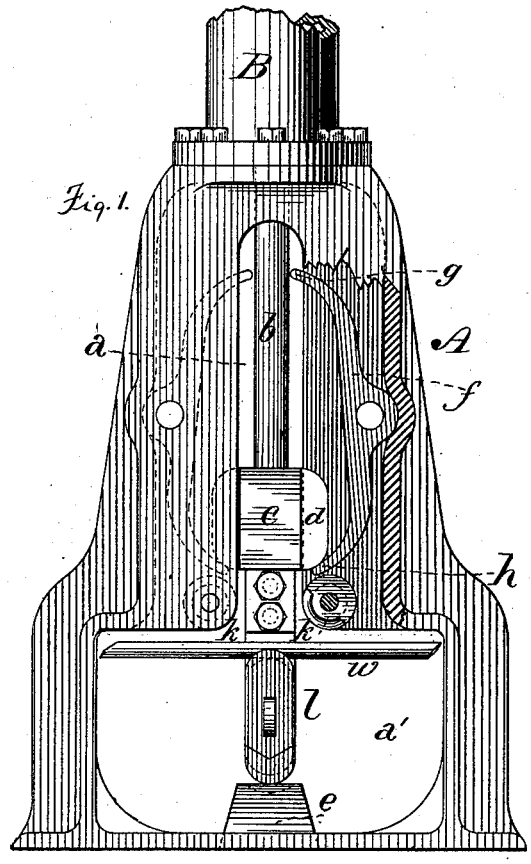
Figure 2:
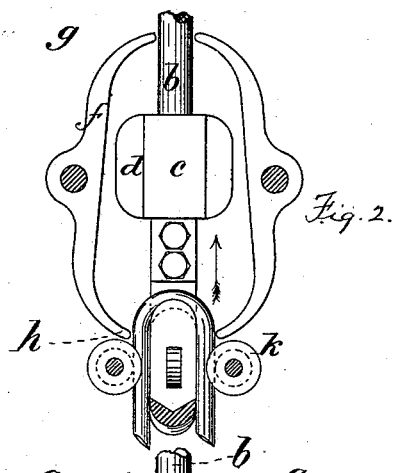
Figure 3:
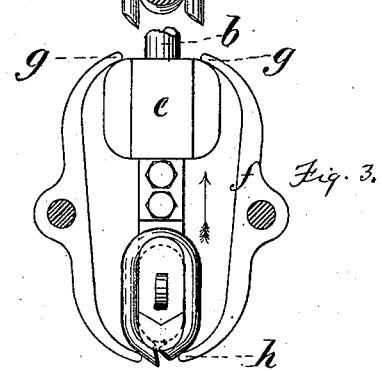
Figure 5:
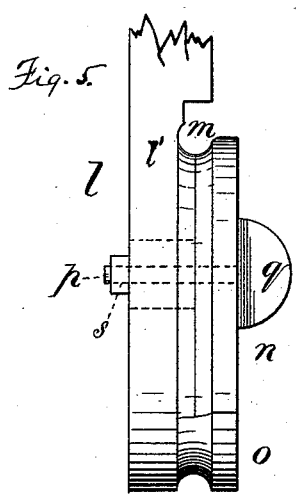
Figure 4:
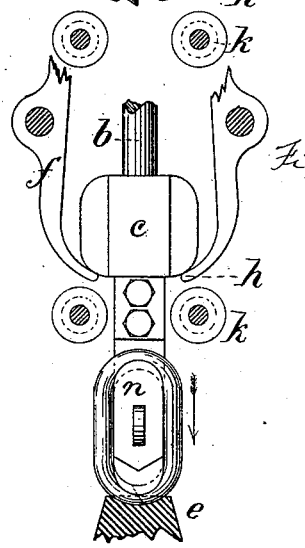

Figure 1 is a view in side elevation of a machine embodying our invention and having one of the side plates broken away. Figs. 2, 3, and 4 are detail views showing the position of certain parts at different stages in the operation of the machine. Fig. 5 is an enlarged detail view of the mandrel or former.

The object of our invention is to so construct and arrange the parts of a machine as to bend a blank into link shape and weld together the ends thereof; and to this end our invention consists, in general terms, in the construction and combination of parts, all as more fully hereinafter described and claimed.

On the top of a frame, A, is secured a steam-cylinder, B, within which is reciprocated a piston of the usual construction, and on the piston-rod *b* is secured a block, *c*, provided with wings *d*, having rounded corners, as shown. This block *c* reciprocates in a slot, *a*, in the frame A, and the wings *d* project into recesses formed in said frame on each side of the slot *a*, the sides of which serve as guides for the block *c* in its movements. The opening *a'* in the lower part of the frame is made of a width equal to or a little greater than the length of the blank to be operated on, and the sides of said opening serve as guides in placing the blank on the mandrel. On the base of the frame, directly under the piston-rod *b*, is placed the anvil *e*, grooved in its face, as shown. In the recesses in the frame are pivoted the levers *f*, having inwardly-curved ends *g h* of sufficient length to project into the path of the winged block *c*. At the lower end of the slot *a*, and within the recesses in the frame, are mounted the grooved rollers *k*, whose outer peripheries are in line with the sides of the slot.

To the lower end of the piston-rod *b* is attached a mandrel or former, *l*, having a shape corresponding to the shape of the link or article to be bent. Around the edge of the mandrel is formed the circular groove *m*, to receive and hold the blank operated on.

To provide for the removal of the finished link from the mandrel, it (the mandrel) is made in two parts, *l'* and *n*, and one of these parts, *l'*, is recessed or cut away on one side for nearly its entire length along the line of the bottom of the groove *m*, and into the recess thus formed is detachably secured the part *n*, in one edge of which is formed part of groove *m*. The lower end, *o*, of the mandrel is left solid, as shown, as that part performs the function of the hammer in the welding operation. To secure the part *n* in place, a bolt, *p*, provided with a head, *q*, is passed through a hole in the part *n*, and to the end of this bolt is secured a button, *s*, and in the mandrel *l* is formed a narrow slot, through which the button *s* passes when putting the part *n* in place. Then by turning the head *q* of the bolt the button will turn across the slot *t* and hold the part *n* in place. The lower end of the part *n* is made V-shaped, and fits into a correspondingly-shaped recess in the part *o* of the mandrel, thereby preventing any lateral movement of the part *n* during the operation of the machine.

The operation of the machine is as follows: The mandrel is lowered until its upper end is below the rollers *k*, as shown in Fig. 1. A heated blank, *w*, having its ends oppositely beveled, is placed in the groove *m* of the mandrel, the sides of the frame serving as guides to center the blank on the mandrel. Steam is then admitted to the cylinder B to raise the mandrel. As the mandrel rises the blank is caught on each side of the mandrel and bent into U shape around its upper end. As the mandrel moves up the rollers force the blank against its sides, as shown in Fig. 2. As the mandrel continues its upward movement the rounded upper ends of the wings $d$ of the block $c$ strike against the ends $g$ of the levers $f$ and force said ends outward and the ends $h$ inward. During the inward movement of these ends $h$ they strike and bend the ends of the blank $w$ around the lower end of the mandrel, causing the beveled ends of the blank to overlap, as shown in Fig. 3. The piston and mandrel are then caused to descend, and the overlapped ends of the blank strike in the groove or recess of the anvil $e$, and are welded together, as shown in Fig. 4. The part $n$ is then removed, thereby allowing of the ready removal of the completed link. If one downward stroke of the mandrel is not sufficient to thoroughly weld the ends of the blank, several short strokes may be taken to complete the welding. It will be noticed that the lower rounded ends of the wings $d$ strike the ends $h$ of the levers $f$ and force them apart, and consequently force the ends $g$ inward to a position to be acted on by the wings at the next upward movement of the block.

Although we have shown the rollers $k$ stationary, they may be made adjustable horizontally to suit blanks of varying thickness.

While we have shown and described this machine as constructed to form links, we do not wish to confine ourselves thereto, as, by simply changing the form of the mandrel, rings, sockets, and other like articles may be bent and welded.

In place of the rollers $k$, we may form a solid abutment at the corners of the lower end of the slot $a$. In such case these solid abutments will bend the blank around the upper end of the mandrel in its upward stroke.

We claim herein as our invention—

1. In a machine for bending and welding links, a reciprocating mandrel, in combination with bending-rollers $k$, vibrating levers $f$, and the anvil $e$, said parts being mounted on a suitable frame, substantially as set forth.

2. In a machine for bending links, a reciprocating piston carrying a mandrel and provided with a guide-block having rounding corners, in combination with the vibrating levers $f$, having inwardly-bent ends, said parts being mounted in a suitable frame in such relation to each other that the upward movement of the guide-block will close the lower or operative ends of the levers $f$, and the downward movement of the block will close the upper ends of said levers, thereby bringing said upper ends in position to be operated on by the block in its upward movement, substantially as set forth.

3. In a machine for bending and welding links, the combination of the frame A, slotted and recessed as described, the reciprocating piston $b$, carrying a mandrel, and provided with the winged guide-block $c$, the bent vibrating levers $f$, pivoted in the recesses of the frame, and the anvil $e$, substantially as set forth.

4. In a mandrel for a link bending and welding machine, the part $l'$, recessed as described, and having the solid head $o$, in combination with the removable part $n$ and a suitable device for locking said parts together, substantially as set forth.

In testimony whereof we have hereunto set our hands.

EMMETT SWARTZWELDER.
JOHN P. SWARTZWELDER.

Witnesses:
DARWIN S. WOLCOTT,
R. H. WHITTLESEY.